Feb. 26, 1935.  E. G. AHNSTRÖM  1,992,343
MEASURING INSTRUMENT
Filed March 10, 1931  2 Sheets-Sheet 2

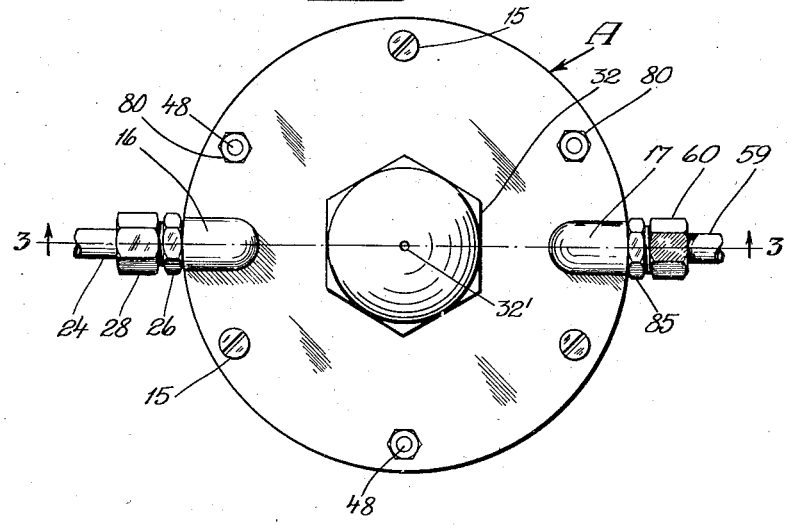
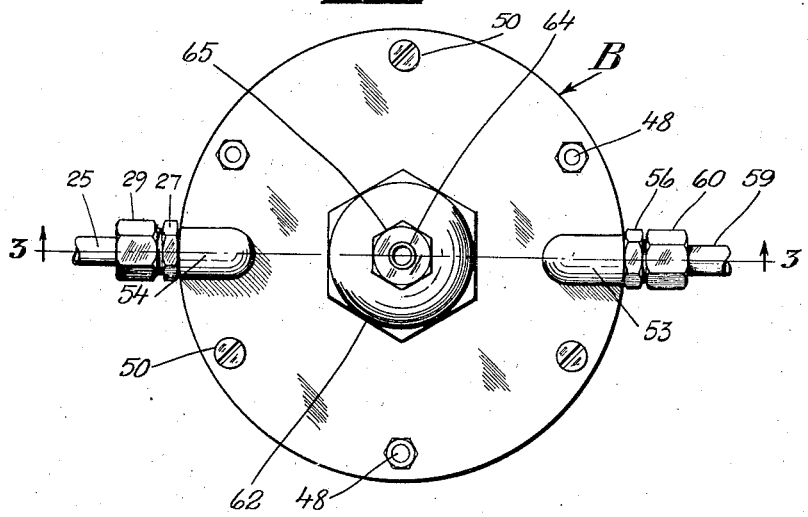

INVENTOR
E.G. AHNSTROM
BY
ATTORNEY

Patented Feb. 26, 1935

1,992,343

UNITED STATES PATENT OFFICE 1,992,343

MEASURING INSTRUMENT

Erik Gustav Ahnström, Stockholm, Sweden, assignor to Aktiebolaget Nautiska Apparater, Stockholm, Sweden, a company of Sweden Application March 10, 1931, Serial No. 521,446 In Sweden March 22, 1930

2 Claims. (Cl. 73—167)

My invention relates to measuring instruments and more particularly to measuring instruments adapted to indicate differential pressures.

The invention consists in an improved pressure measuring instrument in which a resilient member is subjected to varying pressures the difference between which it is intended to measure. Said resilient member influences and regulates at its movements a valve system thereby controlling the flow of an auxiliary pressure fluid to a pressure chamber and further to an indicator.

The nature of the invention will become apparent from consideration of the following description taken in conjunction with the accompanying drawings forming part of this specification, which show a preferred measuring instrument embodying the invention:

Of the drawings:

Fig. 1 is a view of one side of a measuring instrument embodying the invention;

Fig. 2 is a view of the other side of the same instrument as shown in Fig. 1;

Like reference characters denote like parts in the several figures of the drawings.

Figure 3:
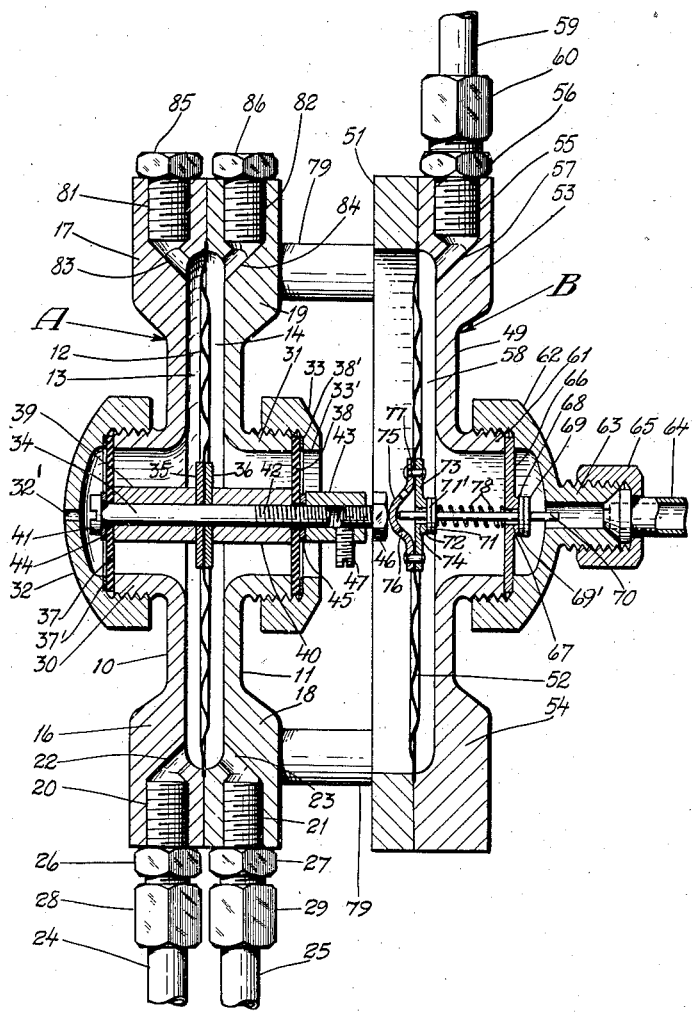
Fig. 3 is a sectional view taken on the line III—III of Figs. 1 and 2.

In the following description and in the claims parts will be identified by specific names for convenience, but they are intended to be as generic in their application to similar parts as the art will permit.

Referring to the drawings, 10 and 11 designate two dished plates suitably manufactured from cast brass forming a casing generally denoted by reference character A. Between plates 10 and 11 a membrane 12 preferably manufactured from phosphor bronze is clamped dividing casing A into two chambers 13 and 14. Plates 10 and 11 are detachably secured to each other by means of suitable screws 15. Each of plates 10 and 11 is provided with two portions 16, 17 and 18, 19 respectively, of which portions 16 and 18 each are provided with a bore 20 and 21 respectively, said bores communicating with chambers 13 and 14 by means of channels 22 and 23 respectively. To bores 20 and 21 pipes 24 and 25 respectively are connected by means of nipples 26 and 27, and nuts 28 and 29 respectively. Each of plates 10 and 11 is further provided with a centrally disposed outwardly extending annular rim 30 and 31 respectively, said rims being threaded to receive screw caps 32 and 33 respectively, of which cap 32 has a bore 32' and cap 33 an opening 33'.

A rod 34 of brass or like material penetrates the centre of membrane 12 where two stiffening washers 35 and 36 are applied to each side of the membrane. Between screw caps 32, 33 on the one hand and rims 30, 31 on the other hand diaphragms 37 and 38 respectively of rubber or like resilient material are interposed. Between diaphragms 37 and 38 respectively and caps 32 and 33 respectively thin metal rings 37' and 38' respectively have been interposed in order to protect said diaphragms when caps 32 and 33 are screwed on or off. In order to avoid differences in pressure in the chamber formed between cap 32 and diaphragm 37 when said cap is applied or removed or due to the movements of said diaphragm bore 32' has been arranged to serve as a vent for said chamber. Rod 34 penetrates also the centres of diaphragms 37 and 38. Around rod 34 and between washers 35, 36 on the one hand and diaphragms 37, 38 on the other hand bushings 39 and 40 respectively are arranged. Bushings 39 and 40 are suitably manufactured from brass or the like. Rod 34 is at its one end provided with a head 41 whereas the other end of same is threaded as at 42. Parts 12, 35, 36, 39, 40, 37, and 38 are clamped together against head 41 by a relatively long nut 43, the one end of which is screwed upon rod 34. Between head 41 and diaphragm 37 a washer 44 has been interposed and a similar washer 45 has been interposed between parts 38 and 43. Into the other end of nut 43 a bolt 46 is screwed and held in position by a threaded pin 47 screwed into an opening of nut 43 and abutting against bolt 46.

To casing A a further casing generally denoted by reference character B is connected by means of three bolts 48 penetrating said casings. Casing B consists of a dished plate 49 to which is secured by means of screws 50 a ring 51. Between plate 49 and ring 51 a membrane 52 is clamped. All dimensions of plate 49 correspond exactly to those of plates 10 and 11, and membrane 52 corresponds to membrane 12. Also plate 49 thus is provided with two portions 53 and 54, of which portion 53 has a threaded bore 55 into which a nipple 56 is screwed and which by means of a channel 57 has communication with chamber 58 formed between plate 49 and membrane 52. To nipple 56 a pipe 59 is connected by means of a nut 60.

Also plate 49 has a centrally disposed outwardly extending annular rim 61 which is threaded to receive a screw cap 62. Screw cap 62 is provided with an outwardly directed hollow extension 63 to which a pipe 64 is connected by means of a nut 65.

Between cap 62 and rim 61 a disc 66 preferably manufactured from brass is clamped, said disc being provided with a centrally disposed opening 67. Disc 66 has around opening 67 an upstanding collar 68 serving as a seat for a disc valve 69 rigidly secured to one end of a valve spindle 70 penetrating said opening. To the other end of spindle 70 a further disc valve 71 is rigidly connected, said further valve being arranged to abut against a seat 72 formed on a disc 73 having a centrally disposed opening 74 inside said seat. Each of valves 69 and 71 is at its left side (Fig. 3) provided with a rubber or like resilient tightening disc 69' and 71' respectively. Within opening 74 spindle 70 is guided. To disc 73 a hood 75 of brass or like material is secured, said hood having perforations 76. Between disc 73 and hood 75 membrane 52 is clamped, said parts 73, 75, and 52 being connected with each other by means of rivets 77. In order to permit free passage under certain circumstances for fluid between chamber 58 and the atmosphere through opening 74 and perforations 76 membrane 52 is provided with an opening inside the rivet connection mentioned. Between disc 66 and valve 71 a spiral spring 78 is provided which tends to keep valves 69 and 71 closed.

Casings A and B are kept in a fixed distance from each other by means of bushings 79 surrounding bolts 48. Bolts 48 are provided with nuts 80 by which parts A and B are held together.

Portions 17 and 19 are each provided with a threaded bore 81 and 82 respectively which communicate with chambers 13 and 14 respectively by means of channels 83 and 84 respectively and which both normally are closed by bolts 85 and 86 respectively.

Membranes 12 and 52 are in the embodiment shown arranged in parallel to each other and rod 34 and spindle 70 at right angles thereto.

Pipes 24 and 25 are each connected with a pressure source, the difference in pressure of which it is intended to measure. The source connected with pipe 24 has a higher pressure than that connected with pipe 25. Pipe 64 is connected with an auxiliary pressure fluid source, whereas pipe 59 is connected with a gauge or similar pressure indicator (not shown). Valves 69 and 71 are kept closed by spring 78 and further by the pressure from the auxiliary pressure fluid source connected with pipe 64 which pressure acts upon valve 69.

The arrangement operates as follows:

Assume that the instrument is adapted for indicating the speed of a vessel and that pipe 24 ends in a so called Pitot tube penetrating the bottom of the vessel and further that pipe 25 is a common pipe also penetrating the bottom of the vessel.

Bolts 85 and 86 are removed and chambers 13 and 14 as well as pipes 24 and 25 are filled with water, after which said bolts again are applied.

If the vessel lies still the pressures in chambers 13 and 14 are the same i. e. in both of said chambers only the hydrostatic pressure is prevailing and the different parts of the instrument described will take in the positions as evident from Fig. 3 of the drawings.

As soon as the vessel however starts to move the pressure in chamber 13 will be increased as in pipe 24 and thus in chamber 13 connected therewith to the hydrostatic pressure now the speed pressure is added. In chamber 14 however the pressure remains unaltered (hydrostatic pressure only). The excess in pressure created in chamber 13 causes membrane 12 to be bent to the right (Fig. 3) and as rod 34 and membrane 12 are rigidly connected with each other rod 34 will also be moved to the right. As already mentioned nut 46 forming the top or free end of rod 34 abuts against hood 75 fixed to membrane 52 while also this last mentioned membrane will be bent to the right. As however valve 71 is rigidly connected with valve spindle 70 and lies close against seat 72 of disc 73 in turn fixed to membrane 52, valve spindle 70 will also be moved to the right against the action of spring 78 whereby valve 69 rigidly connected with valve spindle 70 is raised from its seat 68. The passage from pipe 64 through the hollow extension 63 and valve opening 67 to chamber 58 is now opened and pressure fluid from the auxiliary pressure fluid source connected with pipe 64 will flow to chamber 58 and further through channel 57, nipple 56, and pipe 59 to the pressure indicator connected with pipe 59.

According as the pressure in chamber 58 due to the inflowing pressure fluid increases membrane 52 is again forced to the left (Fig. 3) until valve 69 is closed. At the movement of membrane 52 rod 34 and thus also membrane 12 are also moved in the same direction. At that moment when valve 69 closes the different parts of the instrument due to the existing pressures in chambers 13 and 58 take in their existing starting positions, i. e. the positions as shown in Fig. 3 of the drawings, except the pressure indicator connected with pipe 59 which indicator as long as the speed of the vessel remains unaltered will indicate a pressure which exists in chamber 58 and pipe 59 and which corresponds to the speed of the vessel.

As far however as the speed of the vessel is altered the following will happen:

Assume that the speed is lowered. The pressure in chamber 13 then will sink and the system consisting of membranes 12, 52, and rod 34 will be moved to the left due the fact that the pressure in chamber 58 now preponderates over the difference in pressure between chambers 13 and 14. At this movement of said system valve 71 will be opened and part of the fluid present in chamber 58 will flow out through valve opening 74 and openings 76 in hood 75 to the atmosphere. Hereby the pressure in chamber 58 also is decreased and fluid will flow out from chamber 58 until the pressure in chamber 58 again is equal to the difference in pressure between chambers 13 and 14 at which moment valve 74 again will close. The indicator connected with pipe 59 now indicates a pressure corresponding to the new lower speed of the vessel.

If the speed of the vessel is again raised the pressure in chamber 13 increases with the result that the system consisting of parts 12, 34, and 52 is moved to the right (Fig. 3) thereby opening valve 69. Pressure fluid will now flow in to chamber 58 from pipe 64 until the pressure in chamber 58 is again equal to the difference in pressure between chambers 13 and 14. The indicator connected with pipe 59 now indicates a pressure corresponding to the higher speed.

It is from the above evident that the pressure in chamber 58 is always proportional to the difference in pressure between chambers 13 and 14 which differential pressure thus may be read off from the indicator connected with pipe 59.

If the instrument according to the invention is adapted to be used as a speed meter for vessels the indicator connected with pipe 59 may be graduated in knots which graduation may be effected empirically.

Though I have described the instrument illustrated as applied to the indicating of the speed of a vessel, it is evident that it is not limited to such application, and while I have shown a preferred embodiment of my invention, it will be understood that variations therein may be made without departing from the spirit or scope of the invention and that the novel features of the invention may be embodied in a number of forms of apparatus.

What I claim is:

1. In an instrument of the class described, a casing, a movable resilient member in said casing and dividing said casing into chambers, said resilient member adapted to be subjected to varying pressures, a second member connected with and movable with said resilient member, a pressure chamber including a membrane, said second member abutting said membrane, said pressure chamber having connection to a pressure fluid source and a connection to a pressure indicator, means to effect communication between said chamber and the atmosphere, said membrane having an opening for said means, a first valve member in said first connection controlling the flow of pressure fluid between said source and said pressure chamber, a second valve member controlling the communication between said pressure chamber and the atmosphere, a spindle carrying said valve members and adapted to be moved by said membrane, the seat of said first valve member being arranged in the wall of said pressure chamber and the seat of said second valve member being arranged on the inside of said membrane.

2. In an instrument of the class described, a casing, a movable resilient member in said casing and dividing same into chambers, said resilient member adapted to be subjected to varying pressures, a rod-like member connected with and movable with said resilient member, a pressure chamber including a membrane, said pressure chamber having connection to a pressure fluid source and a connection to a pressure indicator, means to effect communication between said chamber and the atmosphere, said membrane having an opening for said means, a first valve member in said first connection controlling the flow of pressure fluid between said source and said pressure chamber, a second valve member controlling the communication between said chamber and the atmosphere, said valve members being carried by a common spindle abutting said membrane, a seat for said first valve member and on a wall of said chamber, said means having a seat for second valve member and adjacent the opening of said membrane, a perforated hood-like member on the opposite side of said membrane and said rod-like member abutting against said hood-like member.

ERIK GUSTAV AHNSTRÖM.